United States Patent
Sase et al.

[11] Patent Number: 5,898,061
[45] Date of Patent: Apr. 27, 1999

[54] CONTINUOUS PROCESS FOR PRODUCING POLYARYLENE SULFIDE

[75] Inventors: Kiyoshi Sase; Yoshinari Koyama; Masao Oomori, all of Ichihara, Japan

[73] Assignees: Idemitsu Petrochemical Co., Ltd.; Petroleum Energy Center (PEC), both of Tokyo, Japan

[21] Appl. No.: 08/980,119

[22] Filed: Nov. 26, 1997

Related U.S. Application Data

[63] Continuation-in-part of application No. 08/816,035, Mar. 11, 1997, abandoned.

[30] Foreign Application Priority Data

Mar. 11, 1996 [JP] Japan ..................................... 8-053321

[51] Int. Cl.$^6$ .................................................... C08G 75/16

[52] U.S. Cl. .......................................... 528/387; 528/388

[58] Field of Search ...................... 528/387, 388

[56] References Cited

U.S. PATENT DOCUMENTS 5,756,654   5/1998   Sase et al. ............................... 528/387

*Primary Examiner*—Frederick Krass
*Attorney, Agent, or Firm*—Oblon, Spivak, McClelland, Maier & Neustadt, P.C.

[57] ABSTRACT

This invention provides a method for producing polyarylene sulfide continuously, comprising; 1) polymerization step wherein polyarylene sulfide is polymerized from a sulfur compound in the liquid or gas state and a dihalogenated aromatic compound in non-protonic organic solvent, 2) separation step wherein mixture of the polymerization solution and the washing solution is separated into the polymer phase and the solvent phase, and in said separation step said polymer phase is continuously taken out in the liquid state. The method of this invention makes it possible to produce polyarylene sulfide of high purity that it is suitable for molding and injection molding of the seat, the film, the fiber, etc. for the electronic and electric material field etc., with high-molecular-weight and low content of by-products, efficiently and economically.

16 Claims, 1 Drawing Sheet

– 1 –

CONTINUOUS PROCESS FOR PRODUCING POLYARYLENE SULFIDE

This application is a Continuation-in-Part of U.S. application Ser. No. 08/816,035, filed, Mar. 11, 1997 and now abandoned, which is incorporated herein by reference in its entirety.

FIELD OF THE INVENTION

The present invention relates to a continuous process for manufacturing polyarylene sulfide, and, more particularly, to a continuous process capable of manufacturing high molecular weight polyarylene sulfide suitable for forming or injection molding sheets, films, fibers, and the like used in the fields of electron/electric materials, motor vehicles, heat resistant materials at low cost and efficiently.

DESCRIPTION OF THE BACKGROUND ART

Polyarylene sulfide resin (PAS resin) is a thermoplastic resin possessing partial thermosetting properties and exhibiting superior chemical resistance, mechanical characteristics, heat resistance, and the like over a wide temperature range. This resin is known especially as an engineering resin possessing high rigidity and is useful as a heat resistance material for various parts of electronic or electric appliances.

At present, a batch process is mainly used as the commercial manufacturing method for polyarylene sulfide (PAS). As is well known a continuous process is superior with respect to energy efficiency, facility cost, and the like than this batch manufacturing method.

In the U.S. Pat. No. 4,056,515 is disclosed a method for producing PAS using a tank where unreacted p-dichlorobenzene (PDCB), water, and NMP are evaporated after polymerization, PAS is concentrated, and the liquid surface level is controlled using liquid surface level meter(s) which detect the both positions of the liquid phase and the vapor phase by controlling the flow-rate.

However, PAS particles produced by this process contain sodium chloride which is a by-product of the polymerization reaction in the amount of several thousands ppmw. A treatment such as washing with water cannot sufficiently remove the sodium chloride, that is, the resultant PAS still contain more than 200 ppm sodium chloride. The product has problems such as inadequate electrical insulation and corrosion when utilized to manufacture parts in electrical or electronic appliances.

In addition, a method for recovering granular PAS is disclosed in the U.S. Pat No. 4,415,729. This method consists of the following steps: an appropriate amount of separating reagent such as water is added to the reaction mixture which contains molten PAS, and granular PAS is phase-separated from polar solvent by lowering the temperature of the reaction mixture, and is recovered, collecting the granular PAS as described above as slurry which consists of said PAS, NMP, water, etc., separating PAS from the slurry, and washing PAS separated with water.

This method of recovery, however, has a problem that by-products such as lithium chloride formed during the polymerization step tend to remain in PAS, because said PAS is separated from polar solvent after solidifying PAS from the liquid state to granules. Therefore, there were problems that electrically insulation decreases by salts such as lithium chloride contained in PAS, and corrosion is caused easily in an electric circuit (metallic conductor) when PAS is applied to the electric/electronic field which is the main application field of PAS The purpose of this invention is to address the above-mentioned problems and to provide a method for continuously producing PAS suitable for molding and injection molding the seat, the film the fiber, etc. that has a high molecular weight, and contains only a small amount of by-products such as lithium chloride (occasionally called "lithium salt" generically), efficiently and economically.

SUMMARY OF THE INVENTION

Exhaustive research was carried out, and it was found that these problems can be solved by separating the polymer phase and the solvent phase both in the fluid state and taking out only the polymer phase continuously.

This invention is a method for continuously producing polyarylene sulfide (occasionally designated PAS) through the following steps:

1) polymerizing PAS in non-protonicic organic solvent, using a sulfur compound and a dihalogenated aromatic compound in liquid or gas phase (polymerization step),
2) separating the polymerization solution: into the polymer phase and the solvent phase (separation step), and
3) taking out the polymer phase in the liquid state (occasionally designated as fluid state) continuously.

By producing PAS in the polymer phase in this way, by-products such as lithium chloride formed during polymerization of PAS tends to transfer to the solvent phase in the separation step, and the content of byproducts in polymer phase (PAS) taken out can be decreased.

In addition, a phenomenon is observed that PAS with high inherent viscosity (high molecular weight) tends to accumulate in a lower part of the polymer phase in the separation step because of its higher specific gravity. Therefore, it becomes possible to take out only high molecular weight PAS in polymer phase selectively, excluding the oligomer of PAS and the like.

In addition, as polymerization is carried out continuously, the polymer phase is taken out in the liquid state, the size of the manufacturing plant to carry out this invention can be remarkably reduced compared with that of batch type per unit quantity of polymer phase (PAS) taken out.

In addition, it is preferable to have a washing step between the polymerization step and the separation step in carrying out a continuous production of PAS according to this invention, and to have a step to wash the polymerization solution which contains polymerized PAS with washing liquid.

By producing PAS in this way, it becomes possible to wash PAS in the liquid state, by-products such as lithium chloride formed during polymerization of said PAS transfer efficiently to the washing liquid and the solvent phase in the washing step, and the content of the by-product in polymer phase (PAS) taken out after the separation the step can be remarkably decreased.

In addition, it is preferable to control the value of inherent viscosity ($\eta_{inh}$) of the polymer phase (PAS) at 0.15 dl/g or more (solvent, α-chloronaphthalene; measuring temperature, 206° C.; density, 0.4 dl/g; the Ubbelohde's viscometer is used) in carrying out the continuous production of PAS according to this invention.

By restricting the value of inherent viscosity ($\eta_{inh}$) of PAS in the polymer phase taken out in this way, that is molecular weight of PAS, only highly polymerized PAS can be easily taken out by efficiently excluding the oligomer of PAS and the like. In addition, as such high molecular-weight PAS tends to accumulate in a lower part of the polymer phase because of the specific gravity, the possibility to take out PAS in the vicinity of the interface of the polymer phase and the solvent phase is decreased when said high molecular weight PAS is taken out, so that the content of low molecular weight PAS in the polymer phase taken out and by-products can be decreased.

It is preferable to measure inherent viscosity ($\eta_{inh}$) of said PAS beforehand, and to relate it to the electric conductivity or the impedance of PAS because inherent viscosity ($\eta_{inh}$) of PAS can be continuously estimated in the continuous production step of PAS by measuring the electric conductivity or the impedance of PAS.

In addition, it is preferable to take out the polymer phase continuously in the liquid state detecting the interfacial point between the polymer phase and the solvent phase using a liquid level indicator when continuous production of PAS is carried out according to this invention.

By producing PAS in this way, the polymer phase and the solvent phase can be definitely distinguished, and the possibility that the solvent phase which contains a lot of by-products such as lithium chloride is mixed with the polymer phase, the possibility that the yield decreases, and the possibility to take out low molecular weight PAS decrease. As a result, the content of by-products in polymer phase (PAS) taken out decreases, and polymer phase (PAS) highly polymerized can be obtained.

In addition, it is preferable to use the impedance potentiometer-type liquid level indicator in carrying out continuous production of PAS according to this invention.

Although various types of liquid level indicator can be used in this invention, the impedance potentiometer-type can accurately distinguish the polymer phase and the solvent phase. Therefore, the possibility that the solvent phase containing a lot of by-products such as lithium chloride formed during polymerization, the possibility that the yield decreases, and the possibility of taking out low-molecular-weight PAS decrease. Thus it is possible to reduce the content of by-products in the polymer phase (PAS) taken out and to produce PAS highly polymerized.

In addition, it is preferable to detect the interfacial point between the polymer phase and the solvent phase by measuring the electric conductivity of said polymer phase and the solvent phase both at plurality of points in carrying out continuous production of PAS according to this invention.

As the electric conductivity of the polymer phase and that of the solvent phase are different definitely, the polymer phase and the solvent phase can be distinguished more definitely by measuring said electric conductivity. In addition, more accurate detection of the interfacial position of the polymer phase and the solvent phase be s possible by measuring the electric conductivity of the polymer phase and the solvent phase both at plurality of points.

Therefore, the possibility that the solvent phase containing a lot of by-products such as lithium chloride formed during polymerization of PAS is mixed with the polymer phase, the possibility that the yield decrease, and the possibility of taking out low-molecular-weight PAS decrease further.

In addition, as the electric conductivity between the polymer phase and the solvent phase can be measured with direct current (battery), the measurement device becomes simple, and it becomes possible to measure the interfacial position continuously at plurality of points in the separation tank, etc.

In addition, in carrying out continuous production of PAS according to this invention, it is preferable to detect the interfacial position between the polymer phase and the solvent phase by measuring the impedance between the said polymer phase and the solvent phase both at plurality of points.

As the impedance of the polymer phase and that of the solvent phase are different definitely, the polymer phase and the solvent phase can be distinguished definitely by measuring said impedance. In addition, more accurate detection of the interfacial position between the polymer phase and the solvent phase becomes possible by measuring the impedance between the polymer phase and the solvent phase both at plurality of points.

Therefore, the possibility that the solvent phase which contains a lot of by-products such as lithium chloride formed during polymerization of PAS is mixed with the polymer phase, and the possibility that the yield decreases are diminished further. In addition, as comparatively high current of alternating current (current power supply) can be applied when the impedance between the polymer phase and the solvent phase is measured, the error can be minimized, and it becomes possible to measure the interfacial point continuously at plurality of points in the separation tank, etc.

In addition, in carrying out continuous production of PAS according to this invention, it is preferable to control the inherent viscosity ($\eta$inh) of the polymer phase at 0.11 dl/g or more (solvent, $\alpha$-chloronaphthalene; measuring temperature, 206° C.; density, 0.4 dl/g; Ubbelohde's viscometer is used), and that of the solvent phase less than 0.11 dl/g (solvent, $\alpha$-chloronaphthalene; measuring temperature, 206° C.; density, 0.4 dl/g; Ubbelohde's viscometer is used).

In addition, it is preferable to carry out polymerization using lithium hydroxide and/or lithium N-methylaminobutyrate non-protonic organic solvent in carrying out continuous production of PAS according to this invention.

By producing PAS in this way, lithium hydroxide and/or lithium N-methylaminobutyrate react the sulfur compound in liquid or gas state easily, providing raw material for PAS, so that polymerization can proceed efficiently.

In addition, in carrying out continuous production of PAS according to this invention, it is preferable to have an evaporation step for the polymer phase after the separation step, and to treat said polymer phase by the flash distillation method.

By producing PAS in this way, it is possible to decrease the amount of the solvent and lithium salts in PAS, and to produce PAS of high quality.

In addition, it is preferable to have a cooling step of the polymer phase after the separation step, to cool (and solidify) said polymer phase down to 230° C. or lower in carrying out continuous production of PAS according to this invention.

By producing PAS in this way, the possibility that PAS is pyrolyzed during the cooling process becomes lower.

In addition, it is preferable to control the concentration of lithium chloride in the polymer phase less than 200 ppmw in carrying out continuous production of PAS according to this invention.

By controlling the concentration of lithium chloride in PAS in this way, problems such as decrease in insulation effect and metallic corrosion can be remarkably decreased even if it is applied to electric/electronic field which is the main field of said PAS.

In addition, it is preferable to have a recovery step for lithium chloride after the separation step, to add hydroxide of alkali metal and/or alkali earth metal to the solvent phase after the polymer phase is removed, and to convert lithium chloride to lithium hydroxide which can be re-used in the step again in carrying out continuous production of PAS according to this invention.

In addition, it is preferable to carrying out stirring at a rotation rate of 50–700 rpm in the washing step in carrying out production of PAS continuously according to this invention.

By performing the washing step with stirring at the rotation rate of 50–700 rpm in this way, by-products such as lithium chloride formed during polymerization of PAS transfer more efficiently to the washing liquid and the solvent phase in the washing step, and the content of byproducts in the polymer phase taken out after the step of the separation can be decreased remarkably. There are possibilities that the stirring effect is not enough and washing efficiency decreases at a rotation rate slower than 50 rpm, and that PAS precipitates at a rotation rate faster than 700 rpm.

In addition, it is preferable to control the addition ratio of the washing liquid within a range of 5–50 wt % in carrying out continuous production of PAS according to this invention.

There are possibilities that the washing efficiency with said washing liquid becomes weak at an addition ratio of the washing liquid less than 5 wt % and that PAS precipitates at an addition ratio of the washing liquid more than 50 wt %. Therefore, it is more preferable to add the washing liquid within a range of 5–20 wt % from the viewpoint of the balance of washing efficiency and prevention of precipitation with the washing liquid.

In addition, it is preferable to control the pH value of ten-fold diluted solution of the mixture of the washing liquid and the polymerization solution with ion exchange water of pH7 at 6.5 or lower in carrying out continuous production of PAS according to this invention.

There is a possibility that the molecular weight distribution of PAS obtained is broadened at pH higher than 6.5. In adjusting the pH within such a range, it is preferable to use an acid selected from the group consisting of acetic acid, hydrochloric acid, phosphorus acid, silicic acid, carbonic acid, and propionic acid, although well-known inorganic acids and/or organic acids may be used.

DETAILED DESCRIPTION OF THE INVENTION AND PREFERRED EMBODIMENT

Figure 1:
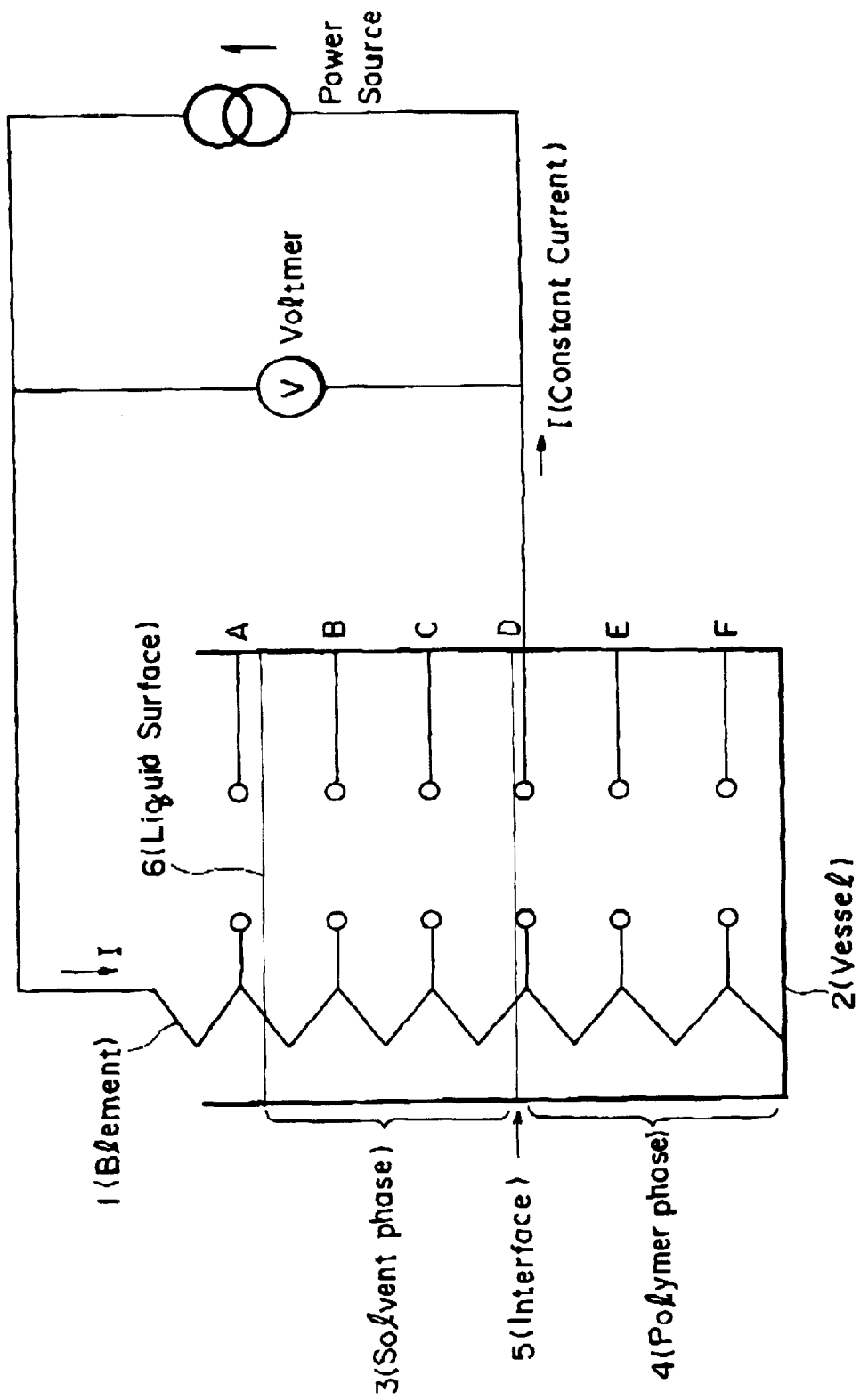
FIG. 1 is a diagram schematically showing the principle for detecting the interface of the impedance potentiometer-type liquid level meter used in the example of the present invention.

The continuous process for manufacturing polyarylene sulfide of the present invention is roughly classified into a polymerization step, a washing step, and a separation step.

I. Polymerization Step

1. Polymerization components (1) Non-protonicic organic solvent

As the non-protonicic organic solvent, a non-protonicic polar organic compound (for example, an amide compound, lactam compound, urea compound, organic sulfur compound, or cyclic organic phosphorus compound) can be suitably used as an independent solvent or a mixed solvent in the present invention.

Given as specific examples of the amide compound among these non-protonic polar organic compounds are N,N-dimethylformamide, N,N-diethylformamide, N,N-dimethylacetamide, N,N-diethylacetamide, N,N-dipropylacetamide, N,N-dimethylbenzic acid amide, and the like.

Given as specific examples of the lactam compounds are caprolactam; N-alkyl caprolactams such as N-methyl caprolactam, N-ethyl caprolactam, N-isopropyl caprolactam, N-isobutyl caprolactam, N-n-propyl caprolactam, N-n-butyl caprolactam, and N-cyclohexyl caprolactam; N-methyl-2-pyrrolidon (NMP), N-ethyl-2-pyrrolidone, N-isopropyl-2-pyrrolidone, N-isobutyl-2-pyrrolidone, N-n-propyl-2-pyrrolidone, N-n-butyl-2-pyrolidone, N-cyclohexyl-2-pyrrolidone, N-methyl-3-methyl-2 -pyrrolidone, N-ethyl-3-methyl-2-pyrrolidone, N-methyl-3,4,5-trimethyl-2-pyrrolidone, N-methyl-2-pyrrolidone, N-ethyl-2-piperidone, N-isopropyl-2-piperidone, N-methyl-6-methyl-2-piperidone, N-methyl-3-ethyl-2-piperidone, and the like.

Examples of the urea compounds include tetramethylurea, N,N'-dimethylethylene urea, N,N'-dimethylpropylene urea, and the like.

Given as examples of the organic sulfur compounds are dimethylsulfoxide, diethylsulfoxide, diphenylsulfone, 1-methyl-1-oxosulfolane, 1-ethyl-1-oxosulfolane, and 1-phenyl-1-oxosulfolane, and as examples of the cyclic organic phosphorus compounds are 1-methyl-1-oxophosphorane, 1-n-propyl-1-oxophosphorane, 1-phenyl-1-oxophosphorane, and the like.

These non-protonic polar organic compounds can be used either individually or in combinations of two or more. In addition, these compounds may be used as the non-protonic organic solvent mixed with other solvents which do not affect the object of the present invention.

Among these non-protonic organic solvents, N-alkyl caprolactams and N-alkyl pyrolidones are preferred, with N-methyl-2-pyrolidone being particularly preferred.

(2) Lithium hydroxide and/or lithium N-methylaminobutyrate

There are no specific restrictions as to the lithium hydroxide and/or lithium N-methylaminobutyrate which are optionally used as required in the present invention. Commercially available products can be used so long as such products have a high purity.

As the lithium N-ethylaminobutyrate, the compound produced by the process previously filed as an application for patent by the applicant of the present invention and disclosed as Japanese Patent Application Laid-open No. 25123/1994 or a process filed by the same applicant as Japanese Patent Application No. 11404/1994 are preferably used.

Specifically, N-methyl-2-pyrolidone and hydroxide of an alkali metal other than lithium are reacted in a non-protonic organic solvent to synthesize an alkali metal salt of N-methylaminobutyric acid (i.e. an alkali metal salt other than lithium of N-methylaminobutyrate).

Next, to reduce the water content in the reaction mixture which contains the alkali metal salt other than lithium of N-methylaminobutyric acid, such as sodium N-methylaminobutyrate, obtained by the synthesis of the alkali metal salt other than lithium of N-methylaminobutyric acid, such as sodium N-methylaminobutyrate, water is removed from the mixture. This removal of water is carried out by a conventional method such as distillation. In this instance, there are no problems even if a part of the organic solvent is removed. The alkali metal salt other than lithium of N-methylaminobutyric acid such as sodium N-methylaminobutyrate synthesized in this manner may be isolated before proceeding to the next step as the raw material. However, it is usually more advantageous to use the reaction mixture from which water has been removed as is or after suitably adjusting the amount of solvent.

The solution of the alkali metal salt other than lithium of N-methylaminobutyric acid such as sodium N-methylaminobutyrate of which the water content has been reduced in the previous step thus prepared is caused to come into contact with lithium chloride thereby causing this alkali metal salt other than lithium of N-methylaminobutyric acid to react with the lithium chloride to synthesize lithium N-methylamino-butyrate. In this instance, chlorides of alkali metal components of the alkali metal salts other than lithium of N-methylaminobutyric acid such as sodium N-methylaminobutyrate (i.e. chlorides of the alkali metal components other than lithium) are produced as by-products. These by-products are removed to obtain a solution of lithium N-methylamino-butyrate from which alkali metal components other than lithium have been completely removed.

In the present invention, either one of lithium hydroxide or lithium N-methylaminobutyrate may be used, or both of these may be used.

(3) Liquid or gaseous sulfur compound

Hydrogen sulfide can be suitably used as the liquid or gaseous sulfur compound in the present invention, although there is no specific limitation as to the kind of sulfur compound.

(4) Dihalogenated aromatic compound

Although there are no specific limitations to the dihalogenated aromatic compound used in the present invention, known compounds for the manufacture of polyarylene sulfide can be given as suitable examples.

Such known compounds include, for example, dihalogened benzenes such as m-dihalogen benzene and p-dihalogen benzene; alkyl substituted dihalogen benzenes such as 2,3-dihalogen toluene, 2,5-dihalogen toluene, 2,6-dihalogen toluene, 3,4-dihalogen toluene, and 2,5-dihalogen xylene; cycloalkyl substituted dihalogen benzenes such as 1-ethyl-2,5-dihalogen benzene, 1,2,4,5-tetramethyl-3,6-dihalogen benzene, 1-n-hexyl-2,5-dihalogen benzene, 1-cyclohexyl-2,5-dihalogen benzene; aryl substituted dihalogen benzenes such as 1-phenyl-2,5-dihalogen benzene, 1-benzyl-2,5-dihalogen benzene, and 1-P-tolyl-2,5-dihalogen benzene, dihalobiphenyls such as 4,4'-dihalobiphenyl; dihalonaphthalenes such as 1,4-dihalonaphthalene, 1,6-dihalonaphthalene, and 2,6-dihalonaphthalene.

The two halogens in these dihalogenated aromatic compounds may be the same or different and may selected from among fluorine, chlorine, bromine, and iodine. Among these, dihalogen benzenes are preferred, with dihalogen benzenes containing 50 mol % or more of p-dichlorobenzene being particularly preferred.

(5) The amount of the components used

As described later, a non-protonic organic solvent, sulfur compounds lithium hydroxide and/or lithium N-methylaminobutyrate are fed to a reaction vessel in a feeding operation and mixed. In this instance, the proportion of lithium hydroxide and/or lithium N-methylaminobutyrate to sulfur compound should be such that the molar ratio of sulfur atom/lithium atom is 1/1. Unreacted sulfur compound is removed prior to provisional polymerization. For example, when hydrogen sulfide is used as the sulfur compound, unreacted hydrogen sulfide can be removed by bubbling nitrogen or the like through the system. Alternatively, lithium hydroxide or a lithium salt such as lithium N-methyaminobutyrate may be added to the system. In addition, because the process of the present invention is a continuous process, the proportion of the components is equal to the ratio of flow rates (weight, mol, etc. per unit time). This applies in the following descriptions.

The amount of the dihalogen aromatic compounds in terms of molar ratio to the sulfur atom (dihalogen aromatic compound/sulfur atom) is in the range of 0.5 to 2.0, preferably 0.9 to 1.3. If this ratio is less than 0.5, the PAS may be decomposed; if larger than 2.0, on the other hand, the cost for recovering the dihalogen aromatic compound may increases.

In addition, the amount of dihalogen aromatic compound contained in 1 l of the non-protonic organic solvent should also be adjusted to the range of 0.8 to 4.0 mols, preferably 1.2 to 3.7 mols. If less than 0.8 mol/l, there is a possibility that the molecular weight of the product sharply decreases and it is difficult to control the molecular weight. There is a possibility that the molecular weight also decreases when the amount of dihalogen aromatic compound is more than 4.0 mol, resulting in a resin product with properties having only a low commercial value.

In the present invention, a branching agent can be optionally incorporated into the reaction system in addition to the above described dihalogenated aromatic compounds, as required. Such a branching agent is suitably selected from the group consisting of halogenated aromatic compounds containing active hydrogen, polyhalogen aromatic compound containing three or more halogen atoms in one molecule, and polyhalogen aromatic nitro compounds.

The amount of the branching agent which is optionally used is usually in the range of 0.0005 to 0.05 mol, and preferably 0.001 to 0.02 mol, for one mol of hydrogen sulfide.

2. Polymerization Process

The polymerization process of the present invention is explained according to the order of operations.

(1) Feed charge operation

This operation comprises charging a vessel, for example, a polymerization reactor, with a sulfur compound, lithium hydroxide and/or lithium N-methylaminobutyrate, a dihalogen aromatic compound, and a non-protonic organic solvent. The amount of each component charged (i.e. the ratio of flow rate of each component fed into a specified vessel) is within the range defined above.

Although there are no specific limitations to the order in which these components are fed into the vessel, the following three methods are given as preferred embodiments. In these examples hydrogen sulfide is used as a sulfur compound.

① A method comprising preparing first a solution of lithium hydroxide and/or lithium N-methylaminobutyrate and a dihalogenated aromatic compound in a non-protonic polar organic solvent and then bubbling hydrogen sulfide into this solution to dissolution.

② A method comprising bubbling hydrogen sulfide into a non-protonic polar organic solvent to prepare a solution of hydrogen sulfide in the non-protonic polar organic solvent and then mixing this solution with lithium hydroxide and/or lithium N-methylaminobutyrate and dihalogenation aromatic compound.

③ A method comprising preparing a solution of lithium hydroxide and/or lithium N-methylaminobutyrate in a non-protonic polar organic solvent, bubbling hydrogen sulfide into this solution, and then adding a dihalogenated aromatic compound to this solution.

The temperature of the reaction system when hydrogen sulfide is injected is preferably 0 to 170° C. to maintain the hydrogen sulfide gaseous. A more preferable temperature range is 80 to 150° C., with the range of 120 to 140° C. being ideal. If this temperature is lower than 170° C., solid materials may be produced.

When hydrogen sulfide is used, the hydrogen sulfide may be injected either at atmospheric pressure or under pressure. Although there are no specific restrictions to the time period for injecting hydrogen sulfide, it is desirable that the hydrogen sulfide be bubbled from the start until the end of the manufacturing process because the process of the present invention is a continuous process, Although the amount of hydrogen sulfide used varies according to various conditions of the process, it is desirable that hydrogen sulfide in an amount (mol) which is twice the amount of the unreacted dihalogen compound in the reactor be added. Excessive hydrogen sulfide may be removed by any known method.

The linear flow rate and residence time of the polymerization solution in the vessels used for the feed charge operation vary according to the amount of each component flowing into the vessels and the shape and size of the vessels. The shape of the vessel s and the rate of components at the entrance are adjusted so that a linear flow rate of preferably 0.0005 to 0.5 m/min and a residence time of 0.1 to 20 hours, preferably 0.1 to 10 hours, and more preferably 0.1 to 5 hours, are achieved. If the linear flow rate is less than 0.0005 m/min, the productivity may be impaired; if more than 0.5 m/min, the polymerization solution is sent to the next polymerization operation or to the preliminary polymerization operation before a sufficient amount of lithium sulfide ($Li_2S$) may be synthesized, thereby impairing the polymerization efficiency.

The linear velocity in the present invention is indicated by $A/\rho S$ (cm/min) wherein A is the rate of polymer inflow (g/min), $\rho$ is the density of polymer ($g/cm^3$), and S indicates the section of the vessel ($cm^2$).

If the residence time is less than 0.1 hour, the polymerization solution is sent to the next polymerization operation or to the preliminary polymerization operation before a sufficient amount of lithium sulfide ($Li_2S$) may be synthesized, thereby impairing the polymerization efficiency. If longer than 20 hours, there is a possibility that the productivity will be decreased.

It is desirable to keep the amounts of components flowing in and out of each vessel equal to maintain the liquid level in the vessel constant. A commonly known flow meter and liquid surface level meter can be used for adjusting the flow rate.

(2) Preliminary polymerization operation

In the present invention, it is desirable for manufacturing high polymer PAS to effect preliminary polymerization of lithium hydroxide and/or lithium N-methylaminobutyrate, the sulfur compound, and the dihalogenated aromatic compound in the non-protonic organic solvent.

There are no restrictions on the method for effecting this preliminary polymerization. The aforementioned Japanese Patent Application Laid-open No. 248077/1994 and Japanese Patent Application No. 104518/1994 discloses processes for manufacturing PAS which include preliminary polymerization prior to the main polymerization. These processes may be followed in the present invention.

An embodiment of the reaction conditions for the preliminary polymerization will now be described.

A dihalogened aromatic compound, water, and a non-protonic organic solvent are added to the reaction mixture obtained in the feed charge operation (1) and the mixture is maintained at 180 to 250° C. for 0.1 to 10 hours, preferably 1 to 6 hours If the reaction time is less than 0.1 hour, the reaction may not progress. A reaction time in excess of 10 hours, on the other hand, does not give the results proportionate to the lengthened reaction time. It is desirable that the amount of each polymerization component satisfy the following conditions. Here, the amount of each component is indicated by the flow rate of the component fed into the preliminary polymerization vessel.

① The number of mol of the dihalogenated aromatic compound contained in 1 liter of non-protonic organic solvent is in the range of 0.8 to 4.0 (mol/l) and preferably 1.2 to 3.7 mol/l). If less than 0.8 (mol/l), the molecular weight steeply decreases and it becomes difficult to control the molecular weight. The molecular weight also decreases when the number of moles of the dihalogenated aromatic compound is more than 4.0 (mol/l), so that it is difficult to ensure commercially viable properties for the resulting resin.

② The amount of the dihalogenated aromatic compound used for one mol of sulfur compound is in the range of 0.5 to 2 mol, preferably 0.9 to 1.3 mol. If less than 0.5 mol, the PAS may be decomposed; if more than 2.0 mol, the cost for recovering the dihalogenated aromatic compound may be increased.

③ The ratio by weight of water and the non-protonic organic solvent (water/non-protonic organic solvent) should be more than 3/97, preferably from 5/95 to 15/85. If less than 3/97, the polymerization may not sometimes progress. If more than 15/85, the molecular weight of the resulting polymer decreases. In addition, the vapor pressure at the reaction temperature of 260° C. may be increased, causing problems in the equipment.

The linear flow rate and residence time of the polymerization solution in the vessel vary according to the amount of the components flowing into the vessel, and the shape and size of the vessel. The shape of vessel and the flow rate of the components at the entrance of the vessel are adjusted so that the linear flow rate of preferably 0.0005 to 0.5 m/min and the residence time of 0.1 to 20 hours, preferably 0.1 to 10 hours, and more preferably 0.1 to 5 hours, are attained. If the linear flow rate is less than 0.0005 m/min, the productivity will be impaired; if more than 0.5 m/min, the polymerization solution is sent to the next polymerization operation before the preliminary polymerization operation has sufficiently occurred, so that there Is a possibility that the operation has no significance.

If the residence time is less than 0.1 hour, the polymerization solution is sent to the next polymerization operation before the preliminary polymerization operation may have sufficiently occurred, so that there is a possibility that the operation has no significance. If longer than 20 hours, the productivity may be decreased.

Low molecular weight PAS produced is continuously sent to the following polymerization operation. It is desirable to keep the amounts of components flowing in and out of the preliminary polymerization vessel equal to maintain the liquid level in the vessel constant. A commonly known flow meter and liquid surface level meter can be used for adjusting the flow rate.

(3) Separation of the reaction mixture into a concentrated PAS polymer phase having low molecular weight and a solvent phase After the preliminary polymerization reaction, it is desirable in the present invention to add water to the resulting polymerization solution (I) while heating, as required, to prevent the PAS from being solidified In this instance, the amount of water, in terms of the ratio by weight of water in the polymerization solution (I) and the non-protonic organic solvent (water/non-protonic organic solvent), should be 5/95 or more, and preferably from 5/95 to 15/85. If this ratio (water/non-protonic organic solvent) is less than 5/95, the mixture cannot be separated into a concentrated polymer phase and a solvent phase, so that lithium chloride may not be extracted. If more than 15/85, there is a possibility that the molecular weight of the resulting polymer decreases. In addition, the vapor pressure at the reaction temperature of 260° C. may be increased, causing problems in the equipment.

The water is continuously added during a normal run to separate the concentrated polymer phase and the solvent phase and to continuously transfer the concentrated polymer phase from the reaction vessel into a separate reactor. There are no specific limitations to the method for separation. In a preferred embodiment, the phases are detected and separated using a liquid level meter which can detect the interface of the two phases, such as an impedance potentiometer-type level meter, while removing only the concentrated polymer phase from the lower part of the reactor.

This separation operation is an interim operation in the polymerization step and is different from the main separation step which is later described.

(4) Solvent addition operation

In the present invention, it is desirable to carry out a solvent addition operation while heating the mixture as required, to prevent solidification of PAS. The solvent used for this operation is a mixture of water and non-protonicic organic solvent. The amount of the non-protonicic organic solvent to be added to the concentrated polymer phase is determined so that the concentration of the polymer is in the range of 0.8 to 4.0 mol/l, preferably 1.2 to 3.7 mol/l, of the non-protonicic organic solvent. The amount of water used is determined so that the ratio by weight of water and the non-protonicic organic solvent (water/non-protonicic organic solvent) is 5/95 or more, and preferably from 5/95 to 15/85.

(5) Main polymerization operation

There are no specific restrictions to the method for carrying out the main polymerization operation in the present invention. The conditions disclosed Japanese Patent Application Laid-open No. 248077/1994 and other published literature can be employed As an example of the reaction vessel, an autoclave made of stainless steel (with paddles rotatable at 300–700 rpm as agitator blades) can be given.

The polymerization temperature in the range of 200 to 280° C. is desirable. An extended reaction time is required if the temperature is lower than 200° C. If higher than 280° C., on the other hand, the polymer may be decomposed with heat.

The linear flow rate and residence time of the low molecular weight PAS in the polymerization vessel vary according to the amount of the components flowing into the vessel, and the shape and size of the vessel. The shape of vessel and the flow rate of the components at the entrance of the vessel are adjusted so that the linear flow rate is preferably 0.0005 to 0.5 m/min and the residence time 0.1 to 20 hours, preferably 0.1 to 10 hours, and more preferably 0.1 to 5 hours. If the linear flow rate is less than 0.0005 in/min, the productivity will be impaired; if more than 0.5 m/min, the polymerization does not proceed sufficiently, resulting in a decreased yield If the residence time is less than 0.1 hour, the polymerization does not proceed sufficiently, resulting in a decreased yield; if longer than 20 hours, the productivity may be decreased.

The high molecular weight PAS (with $\eta_{inh}$ of 0.15 or more) produced is continuously sent to the following washing-separation step. It is desirable to keep the amounts of the components flowing in and out of the polymerization vessel equal to maintain the liquid level in the vessel constant. A commonly known flow meter and liquid surface level meter can be used for adjusting the flow rate.

Although the polymerization operations in this section (5) or in the sections (2) and (5) are described as if the polymerization is carried out in a single stage or in two stages, multistage polymerization (three or more stages) is also acceptable. In addition, it is possible that the temperature conditions are changed multistage.

Moreover, it is possible to repeat the operations (3) to (5) one to several times on the polymer solution (II) obtained by the main polymerization. This ensures increasing the molecular weight of the resulting polyarylene sulfide, markedly decreasing the lithium content, and to removing impurities such as low molecular weight components. Not only the process is simplified, but also lithium salt can be recovered more efficiently than in conventional processes, thereby reducing the manufacturing cost.

(6) Lithium ion(Lithium chloride) removal operation

In the present invention, lithium ion can be recovered by adding an alkali metal hydroxide or an alkaline earth metal hydroxide after the polymerization operation, as desired.

① Addition of an alkali metal hydroxide or an alkaline earth metal hydroxide

There are no specific restrictions on the alkali metal hydroxide or alkaline earth metal hydroxide added to the polymer solution (II) after removal of PAS. Sodium hydroxide, potassium hydroxide, magnesium hydroxide, and the like can be given as examples. Sodium hydroxide which is industrially easily available and inexpensive is particularly preferred.

② Method for addition of alkali metal hydroxide or the alkaline earth metal hydroxide There are no specific restrictions on the method for adding the alkali metal hydroxide or alkaline earth metal hydroxide used in the present invention. For example, commonly used alkali metal hydroxide or alkaline earth metal hydroxide in the form of an aqueous solution or solid can be mixed in a vessel or mixed by line blending.

The amount used, in terms of hydroxide ion for one mol of lithium ion, is in the range of 0.90 to 1.1 mol, and preferably 0.95 to 1.05 mol. There are no problems in the production of lithium hydroxide even if hydroxide ion in an amount greater than 1.1 mol is used. However, the use of such an excess amount is not desirable in view of an increased unit consumption of the alkali metal (or alkaline earth metal) hydroxide. In addition, the purity of the resulting PAS may be decreased depending on the succeeding operations. If the amount of the hydroxide ion used is less than 0.9 mol, on the other hand, there is a possibility that lithium is left dissolved as chloride, inducing loss of lithium.

③ Reaction conditions of lithium ion and hydroxide ion

There are no specific restrict ions on the conditions under which lithium ion and hydroxide ion are reacted. In the case where an alkali metal hydroxide or alkaline earth metal hydroxide is used as an aqueous solution, the reaction temperature in the range, usually of 0 to 230° C., preferably 65 to 150° C., is employed. When solid alkali metal hydroxide or alkaline earth metal hydroxide is used, the reaction temperature is usually 60 to 230° C., preferably 90 to 150° C. If the reaction temperature is too low, the solubility is low so that the reaction rate may be markedly retarded. When the temperature is higher than the boiling point of NMP, the reaction may be carried out under pressure, which is disadvantageous in process economy. There are no specific restrictions on the reaction time.

④ Recovery of lithium ion

In the continuous process for the manufacture of PAS such as the process of the present invention, it is desirable that the lithium hydroxide be used in the next step as a solution. Specifically, when liquid or gaseous sulfur compound is added to a solution of non-protonic organic solvent in which solid lithium hydroxide or chloride of alkali metal or alkaline earth metal is present, the lithium hydroxide is converted into LiSH which is soluble in the non-protonic organic solvent, whereby undissolvable alkali metal chloride of alkaline earth metal chloride can be separated and removed by solid-liquid separation. The solution of lithium hydroxide is then supplied to the next step of the continuous PAS manufacturing process as is.

II. Washing Step

Water is added to the polymer solution II coming out of the polymerization vessel to the extent that the PAS does not become solidified, to send the polymer solution II to a washing tank. Although the amount of water to be added varies according to the amount of the polymer solution II and the temperature any amount is acceptable inasmch as the mixture is not cooled too much to produce a precipitate of PAS.

Therefore, as described previously, it is preferable to control the addition ratio of the washing liquid within the range of 5–50 wt % to the total weight of 100 wt %, more preferably 5–20 wt % in carrying out continuous production of PAS according to this invention.

In addition, as described previously, it is preferable to stir the washing tank usually at 50–700 rpm to mix the polymerization solution II completely.

In addition, as described previously, it is preferable to control the pH value of the ten-fold diluted solution of the mixture of the washing liquid and the polymer solution with ion exchange water of pH7 at 6.5 or lower by adding inorganic acid(s) and/or organic acid(s) to control the molecular weight distribution of PAS narrow.

The linear flow rate and residence time of PAS in the washing tank vary according to the amount of the components flowing into the tank, and the shape and size of the tank. The shape of tank and the flow rate of the components at the entrance of the tank are adjusted so that the linear flow rate is preferably 0.0005 to 0.5 m/min and the residence time 0.1 to 20 hours, preferably 0.1 to 10 hours, and more preferably 0.1 to 5 hours. If the linear flow rate is less than 0.0005 m/min, the productivity may be impaired; if more than 0.5 m/min, the PAS cannot be sufficiently washed. If the residence time is less than 0.1 hour, washing may be insufficient; if longer than 20 hours, the productivity may be decreased.

There are no specific limitations to the washing solvent used so long as the solvent is capable of dissolving impurities and byproducts adhering to the polymer and does not adversely affect the polymer. Given as examples of such a solvent are methanol, acetone, benzene, toluene, water, and NMP, with water being particularly preferred. It is preferable to use water or a mixture of water and NMP (e.g 50/50,w/w).Moreover, it is preferable to facilitate plural washing tanks and to carry out the forgoing washing-step since the higher washing effect can be obtained.

III. Separation Step

The polymerization solution after the polymerization step and the washing step is introduced to the separation tank. In the steady-state operation, the mixture of the polymerization solution and water separates into the polymer phase and the solvent phase in the separation tank, and the polymer phase is taken out of the separation tank (separation vessel) in the liquid state, wherein "polymer phase" is defined as the phase whose inherent viscosity is 0.11 dl/g or more, containing PAS as a main component, more preferably 0.15 dl/g or more, wherein "containing PAS as a main component, more preferably 0.15 dl/g or more" means that the polymer phase contains 50 wt % or more of PAS of 100 wt % with inherent viscosity of 0.15 dl/g or more, more preferably 75 wt % or more, the most optimally 85 wt % or more, in addition, "solvent phase" is defined as the part which remains, when said polymer phase is removed from the polymerizing solution, and which is composed of non-protonic solvent, unreacted components, etc.

It is desirable to provide a liquid level meter in this separator. There are no specific limitations to the liquid level meter so long as the meter can detect the interface of the two phases and can separate these phases. Moreover, it is desirable that the liquid level meter have an accuracy R=100 $(H_1-H_2)/H_1$ (wherein $H_1$ is the height of the surface from the bottom of the tank (actual length), $H_2$ is the height measured by the level meter) of less than ±20%, preferably ±15%, and more preferably ±10%. If the polymer cannot be separated from the solvent, the solvent phase contains a large amount of the polymer. The polymer may be precipitated when cooled in a pipe and cause clogging of the pipe. The polymer phase, on the other hand, may contain a large amount of lithium salt. There is a possibility that this make the washing operation of the polymer difficult.

When the above-described R is greater than ±20%, separation is insufficient and problems in the maintenance of the manufacturing facilities, such as clogging of the pipe, may occur.

A preferred embodiment involves detecting and separating the phases using a liquid level meter which can detect the interface of the two phases, such as an impedance potentiometer-type level meter, while removing the polymer phase and the solvent phase from the separator. In that case, it is desirable to adjust the total amounts of the polymer phase and the solvent phase to be removed equivalent to the amount of the feed supplied to the washing-separation tank. A typical example of such a washing-separation tank has a structure which is long in the vertical direction with a feeding port in the middle of the tank from which the polymer solution is gently fed, while the polymer is removed from the lower part of the tank.

The impedance potentiometer-type liquid level meter which is optionally used in the present invention has a structure as outlined in FIG. 1. The principles of operation and the interface detection are as follows.

<Principle of Operation>

Element 1 with an impedance applicable to the measured fluid is installed in tank 2. The element 1 is short circuited by a fluid up to the position where the measured fluid is filled. The voltage produced when a constant current is caused to flow through element 1 is inversely proportional to the level of liquid surface 6.

<Principle of interface detection>

This level meter is installed in the polymerization solution which is separated into two phases, one a solvent phase 3 and the other a polymer phase 4, wherein the polymer phase has a resistance greater than that of the solvent phase. Then, the voltages at points A to E are measured. The produced voltage decreases at a specific rate from the liquid surface A to the interface D (interface 5). The electric current flows only with difficulty after the interface D (interface 5) due to high insulating capacity of the polymer phase 4. The point where the voltage suddenly changes is detected as an interface.

The linear flow rate and residence time of the PAS in the separator vary according to the amount of the components flowing info the separator, and the shape and size of the separator. The shape of separator and the flow rate of the components at the entrance of the separator are adjusted so that the linear flow rate is preferably 0.0005 to 0.5 m/min and the residence time 0.1 to 20 hours, preferably 0.1 to 10 hours, and more preferably 0.1 to 5 hours. If the linear flow rate is less than 0.0005 m/min, the productivity will be impaired; if more than 0.5 m/min, turbulence may occur in the interface between the solvent phase and the polymer phase, allowing excess solvent to enter the polymer phase. This may cause the shut-down of the continuous production unit.

If the residence time is less than 0.1 hour, separation is insufficient; if longer than 20 hours, the productivity is decreased.

The same operation mentioned in (6) above can be applied for recovering lithium hydroxide from the separated solvent phase (of which the major components should be NMP, water, and LiCl). The recovered lithium hydroxide can be recycled to the feed charge operation.

The washing and separation steps may be repeated for optional number of times to obtain a sufficient washing and separation effect IV. Post treatment step (1) Solvent removal operation In the present invention, it is desirable to remove the solvent because the polymer phase obtained by the washing and separation steps still contains a certain amount of solvent. There are no specific restrictions to this solvent removal operation. The solvent removal method used in known PAS manufacturing processes (for example, a flash method disclosed by Japanese Patent Application Laid-open No. 33878/1995) can be used.

By having the evaporation step of the polymer phase after the separation step and by flash-distilling said polymer phase in this way, the amount of the solvent in PAS and the amount of lithium chloride can be decreased remarkably and PAS of higher quality can be produced In addition, it is also preferable to have the cooling step of the polymer phase after the separation step to cool the said polymer phase down to 230° C. or lower to precipitate/ solidify PAS. The possibility that PAS is pyrolyzed during the producing process is quite low.

Any level meters which can detect the interface of the polymer phase and gaseous phase can be used in this operation. A suitable meter can be selected from various level meters.

The linear flow rates and residence times of the polymer phase in the vessel used in this operation vary according to the amount of components flowing into the vessel, and the shape and size of the vessel. The shape of the vessel and the flow rate of the components at the entrance to the vessel are adjusted so that the linear flow rate is preferably 0.0005 to 0.5 m/min and the residence time 0.1 to 20 hours, preferably 0.1 to 10 hours, and more preferably 0.1 to 5 hours.

If the linear flow rate is less than 0.0005 m/min, the productivity will be impaired; if more than 0.5 m/min, the solvent cannot be sufficiently removed.

If the residence time is less than 0.1 hour, the polymerization reaction does not sufficiently proceed; if longer than 20 hours, the productivity is decreased.

(2) PAS collecting operation

The PAS obtained after the solvent removal operation is collected as a melted resin or as particles after solidification by appropriately cooling the melted resin Air-cooling, water-cooling, oil-cooling, and the like can be given as the cooling method.

As described above, PAS containing little amount of by-products, having inherent viscosity ($\eta_{inh}$) of 0.15 dl/g or more, occasionally 0.17 dl/g or more, can be produced more efficiently according to this invention.

Polyarylene sulfide with a solution viscosity ($\eta_{inh}$) of 0.10 or more, preferably 0.17 or more, a melt index (MI) of 0–1000 g/10 minutes, and a sufficiently high molecular weight, optionally capable of producing gel or being prepared as particles with a controlled particle size in the range of 0.5 to 5 mm can be easily and constantly obtained by a simplified process according to the present invention. If a polymer with the target molecular weight cannot be obtained, the operations 1–2-(3) to (5) may be repeated as mentioned above. Particles in the present invention mean typically granules. However, these particles may be in the form of beads. The solution viscosity in the present invention is a viscosity measured on a solution of particles of polyarylene sulfide in α-chloronaphthalene at a concentration of 0.4 dl/g at 206° C. using Ubbelohde's viscosimeter, The amount of lithium chloride contained in the PAS obtained by one cycle of operations 1–2-(1) to (5) may slightly fluctuate depending on various conditions. This amount, however, does not exceed 200 ppm(weight ppm). Although the above-described operations 1–2-(3) to (5) may be repeated an optional number of times.

When the polyarylene sulfide obtained by the present invention is molded into various products, other polymers and fillers, such as a pigment, graphite, metal powder, glass powder, quartz powder, talc, calcium carbonate, glass fiber, carbon fiber, and various whiskers, stabilizers, releasing agents, and like can be added as required.

The polyarylene sulfide obtained by the process of the present invention can be suitably used as a material for various molded articles, films, fibers, machine parts, electric parts, electronic parts, and the like.

As described above, PAS having a molecular weight which is necessary and sufficient for practical application can be efficiently produced using a small facility at a low energy consumption and low cost.

EXAMPLES

The present invention will be explained more specifically by way of examples.

In the examples below, the solution viscosity was measured by the following method.

The polymer obtained was dissolved in a α-chloronaphthalene to a concentration of 0.4 dl/g and the viscosity of the resulting polymer solution was measured using a Ubbelohde's viscosimeter at 206° C. to obtain the solution viscosity ($\eta_{nih}$).

EXAMPLE 1

In this example, a continuous PAS production unit comprising a vessel for the synthesis of lithium hydrosulfide, a vessel for the synthesis of lithium sulfide, two preliminary polymerization vessels, a polymerization vessel, a washing tank, a separator, and a solvent removal vessel was used. All seven vessels had the same cylindrical shape, with a capacity of about 30 liter, an internal diameter of 350 mm, and a height of 300 mm.

<Polymerization step (Feed charge operation)>

To the vessel for the synthesis of lithium hydrosulfide were charged N-methyl-2-pyrolidone (NMP), lithium hydroxide, and hydrogen sulfide at rates of 10.3 kg/h, 1.1 kg/hr, and 1.6 kg/h respectively, at 130° C. under atmospheric pressure for 24 hours. The linear flow rate and the residence time in the vessel were 0.0023 m/min and 2.2 hours, respectively.

A polymerization solution containing lithium hydrosulfide (LiSH) was then fed to the lithium sulfide synthesis vessel at a flow rate of 13 kg/h at 180° C. under atmospheric pressure. The same linear flow rate and residence time as in the above lithium hydrosulfide synthesis vessel were applied. Excessive hydrogen sulfide and water were removed from the vessel by evaporation using the heat in the synthetic system.

<Polymerization step (preliminary polymerization operation)>

The polymerization solution containing lithium sulfide ($Li_2S$) synthesized in the above feed charge operation and p-dichlorobenzene were fed into the preliminary polymerization vessel at a rate of 11.5 kg/h and 3.4 kg/hr, respectively, for 20 hours at 240° C.-kg/cm$^2$.

The linear flow rate in the vessel was 0.0026 m/min and the residence time was 1.9 hours. Low molecular weight PAS was obtained by this operation. A sample was collected and the viscosity ($\eta_{inh}$) was measured as 0.13 dl/g.

<Polymerization step (Main polymerization operation)>

The polymer solution containing the above low molecular weight PAS was fed to the preliminary polymerization vessel I under 260° C.-6 kg/cm$^2$, and then to the polymerization vessel II at a flow rate of 14.9 kg/h. The same linear flow rate and residence time as in the preliminary polymerization operation were applied to obtain high molecular weight PAS. A sample was collected and the viscosity ($\eta_{inh}$) was measured as was 0.20 dl/g. The polymer solution after the polymerization reaction contained 250 g of PAS for 1 l of NMP. The polymer was produced at a rate of 2.5 kg/hr.

<Washing step>

The polymer solution containing high molecular weight PA, water, and NMP were fed to the washing tank at flow rates of 14.9 kg/h, 3.4 kg/h, and 10.2 kg/h, respectively. The mixture was stirred at 200 rpm, while feeding the polymer solution at a linear flow rate of 0.0049 m/min, with a residence time of one hour.

<Separation step>

The polymer solution was then sent to a separator from the washing tank at the same flow rate as in the washing step. The same linear flow rate and residence time of the polymer solution as in the washing step were applied.

An impedance potentiometer-type liquid level meter (a continuous level indicative transmitter, IP-type, manufactured by Diteck Co., maximum measurable depth: 250 mm, material of the element: 304 SS for both liquid-contact sections and non-liquid-contact sections; power source: 100 AC (compatible with 200 V AC and 24 V DC); constant current output: DC 4–20 mV; accuracy ±5%) was installed in the washing tank. Only the polymer phase was removed from the valve in the lower part of the separator at a flow rate of 5.5 kg/hr, while detecting the interface of the NMP phase and the polymer phase.

The solvent phase was removed from the upper part of the separator at a flow rate of 23 kg/hr. The solvent phase was treated in the manner as specified to recover the solvent.

The interface of the polymer phase and the solvent phase detected was at 165 mm from the bottom of the tank, which was in good agreement with the calculated height of 173 mm.

<Post-treatment step>

Because the polymer phase which was removed from the separator contained about 50 wt % of NMP, this phase was fed to the solvent removal tank, where NMP and a small amount of water were removed by evaporation and PAS was collected. During continuous operation for 24 hours there were no pipe choke-up troubles occurring due to PAS which remained in the solvent without being removed. As a result, 60 kg of PAS was manufactured in 24 hours.

The PAS having a viscosity ($\eta_{inh}$) of 0.20 dl/g and a lithium content of 96 ppm were obtained at a yield of 90%.

EXAMPLE 2

The same experiment as in the Example 1 was carried out, except that the solvent separated from the washing tank of which the major component was NMP, was continuously recovered. The amount of this recovered solvent was 552 kg in 24 hours. A 48 wt % NaOH aqueous solution in a total amount of 94 kg was continuously added to this solvent, to produce 66 kg of sodium chloride and 28 kg of lithium hydroxide. The mixture was cloudy due to sodium chloride produced but insoluble in the solvent of which the major component was NMP.

Hydrogen sulfide was injected into the mixture to convert lithium hydroxide into lithium hydrosulfide. Sodium chloride was collected in a centrifugal separator (for 10 minutes at 3000 G). The mixture of NMP and lithium hydrosulfide was returned to the feed charge operation for reuse.

Then, the same procedures as in the Example 1 were carried out to manufacture 60 kg of PAS in 24 hours at a yield of 90%. The PAS obtained had a viscosity ($\eta_{inh}$) of 0.20 dl/g and a lithium content of 96 ppm.

Comparative Example 1

612 kg of NMP and 72 kg of lithium hydroxide were contained in 1000-L polymerization tank, the mixture was heated at a rate of 60 degree/hr injecting hydrogen sulfide, and the temperature was kept at 130° C. for 4 hr.

Then, it was heated to 180° C. to produce lithium sulfide and the lithium sulfide was dehydrated. After the addition of 221 kg of p-dichlorobenzene, the mixture was again heated at a rate of 60° C./hr and subjected to preliminary polymerization at 240° C. under the pressure of 2 kg/cm$^2$ for 2 hours, then polymerized at 260° C. under 6 kg/cm$^2$.

After the polymerization reaction, the product was cooled to 150° C. at a rate of 60° C./hr. The polymer was extracted and washed with water. Water and residual NMP were removed in the solvent removal tank and the polymer was dried. As a result, PAS was manufactured at a rate of 150 kg in 24 hours.

PAS with a viscosity ($\eta_{inh}$) of 0.20 dl/g and a lithium content of 400 ppmw was obtained at a yield of 92%.

COMPARATIVE EXAMPLE 2

The same experiment as in the Example 1 was carried out, except that the washing step and the separation step were omitted. PAS obtained after removal of the solvent contained a large amount of residual lithium of 6400 ppm. The viscosity ($\eta_{inh}$) of the PAS was 0.22 dl/g and the yield was 93%. It was difficult to remove the lithium chloride contained in the solidified PAS even by washing with water (by a batch method). The lithium content was 320 ppm. Lithium content was 110 ppm after washing two more times, but remarkable improvement in lithium content was not given after four times washing.

Specifically, when washed four times in a batch process, there was no difference in the residual lithium content after three washings and four washings. Moreover, the necessity of redrying after washing makes the process inefficient.

The following findings have been obtained from the above examples.

① Comparison of the Example 1 and Comparative Example 1 reveals that when the scale of the polymerization vessel and washing tank is the same, the amount of PAS produced in 24 hours is greater in the Example 1 than in the Comparative example 1, indicating that the productivity is better in the Example 1. Therefore, judging from the productivity of example 1 (60 kg/day by using 30 little reactor vessel),the size of manufacturing vessel according to the present invention becomes about 1/13 of one of the comparative example(1000 little) to produce PAS in same volume.

② In the continuous manufacturing process for PAS shown in the Comparative Example 2, the solvent is removed after the polymerization reaction without washing, so that the resulting PAS contains a large amount of residual lithium and the like.

③ Although the residual lithium content is reduced by washing after removal of solvent, the amount is still as much as 3 to 4 times the amount in the product obtained in the Example 1. Moreover, redrying is necessary after the washing.

What is claimed is:

1. A continuous process for producing polyarylene sulfide, comprising the steps of:
   i) pre-polymerizing a sulfur compound in a liquid or gaseous state and a dihalogenated aromatic compound in an aprotic organic solvent;
   ii) polymerizing the sulfur compound in a liquid or gaseous state and the dihalogenated aromatic compound in an aprotic organic solvent thereby producing a polymer solution; and
   iii) separating the polymer solution into a polymer phase and a solvent phase, and continuously removing the polymer phase in a liquid state from the combined phases.

2. The continuous process for producing polyarylene sulfide according to claim 1, wherein, between said polymerization step and said separation step, the polymer solution is washed, and in the washing step, the polymer solution containing polymerized polyarylene sulfide is washed with a washing liquid.

3. The continuous process for producing polyarylene sulfide according to claim 1, wherein the inherent viscosity ($\eta_{inh}$) of the polymer phase continuously removed is 0.15 dl/g or more as measured with a Ubbelohde's viscometer in α-chloronaphthalene as the solvent at 206° C. at 0.4 dl/g.

4. The continuous process for producing polyarylene sulfide according to claim 1, wherein the interfacial region between the polymer phase and the solvent phase formed upon separation is detected.

5. The continuous process for producing polyarylene sulfide according to claim 4, wherein said interfacial region is detected by an impedance potentiometer as a liquid level indicator.

6. The continuous process for producing polyarylene sulfide according to claim 1, wherein the interfacial region between said polymer phase and the solvent phase is detected by measuring the electric conductivity of the polymer phase and the solvent phase both at a plural number of points.

7. The continuous process for producing polyarylene sulfide according to claim 1, wherein the interfacial region between the polymer phase and the solvent phase is detected by measuring the impedance of the polymer phase and the solvent phase each at a plural number of points.

8. The continuous process for producing polyarylene sulfide according to claim 1, wherein the polymer phase is a phase which contains polyarylene sulfide having an inherent viscosity ($\eta_{inh}$) of 0.11 dl/g or more, and the solvent phase is a phase containing polyarylene sulfide having an inherent viscosity ($\eta_{inh}$) of less than 0.11 dl/g, when the inherent viscosity of the two phases is measured with an Ubbelohde's viscometer at 206° C. at 0.4 dl/g with α-chloronaphthalene as the solvent.

9. The continuous process for producing polyarylene sulfide according to claim 1, wherein said aprotic organic solvent contains both or either lithium hydroxide or lithium N-methylaminobutyrate.

10. The continuous process for producing polyarylene sulfide according to claim 1, wherein, after said separation step, an evaporation is performed in which the polymer phase undergoes flash distillation.

11. The continuous process for producing polyarylene sulfide according to claim 1, wherein, after said separation step, cooling is conducted in which the polymer phase is cooled down to 230° C. or lower, thereby solidifying it.

12. The continuous process for producing polyarylene sulfide according to claim 1, wherein, in the polymer phase continuously removed, the lithium chloride concentration therein is controlled to less than 200 ppm.

13. The continuous process for producing polyarylene sulfide according to claim 1, wherein, after said separation step, lithium chloride is recovered, and in the lithium chloride recovery step, a hydroxide of both or either an alkali metal or an alkaline earth metal is added to the solvent phase from which the polymer phase is recovered, and lithium chloride is recovered as lithium hydroxide.

14. The continuous process for producing polyarylene sulfide according to claim 2, wherein said washing is conducted with stirring at 50–700 rpm.

15. The continuous process for producing polyarylene sulfide according to claim 2, wherein said washing liquid is added to the polymer solution and the washing liquid is added in the washing step in an amount of 5–50 wt. % based on the amount of polymer solution.

16. The continuous process for producing polyarylene sulfide according to claim 2, wherein a mixture of the washing liquid and the polymer solution are obtained, and the combined liquids are diluted such that after a ten-fold dilution with deionized water having a pH of 7, the pH is controlled to 6.5 or lower.

* * * * *